July 11, 1967     D. J. HARDY ETAL     3,330,240

GROUND EFFECT VEHICLE

Filed Aug. 11, 1964     4 Sheets-Sheet 1

INVENTORS
DEREK J. HARDY
MICHAEL T. SMITH

BY *Larson and Taylor*

ATTORNEYS

July 11, 1967  D. J. HARDY ETAL  3,330,240
GROUND EFFECT VEHICLE
Filed Aug. 11, 1964  4 Sheets-Sheet 3

INVENTORS
DEREK J. HARDY
MICHAEL T. SMITH

BY *Larson and Taylor*

ATTORNEYS

# United States Patent Office 3,330,240
Patented July 11, 1967

3,330,240
GROUND EFFECT VEHICLE
Derek J. Hardy and Michael T. Smith, Isle of Wight, England, assignors to Westland Aircraft Limited, Yeovil, England
Filed Aug. 11, 1964, Ser. No. 388,850
Claims priority, application Great Britain, Aug. 30, 1963, 34,333/63
13 Claims. (Cl. 114—67)

This application in part discloses and claims subject matter disclosed in our copending application Ser. No. 379,848, filed July 2, 1964.

This invention relates to ground effect vehicles, and its main purpose is to provide a disposition of features, which in combination may very effectively be comprised in a ground effect vehicle of large size and high speed capability.

It is an object of the invention to provide a ground effect vehicle which is efficient both when cushionborne for high speed operation and as a displacement craft, when good sea-keeping properties, the capability of taking heavy loads, a convenient configuration for low loading, clear deck-space and provision for effective propulsion and navigation are required.

Generally according to the invention, an amphibious ground effect vehicle includes a platform or raft of sufficient positive buoyancy to support the whole vehicle and its load on water, extendable floats capable of buoyantly supporting the platform or raft clear of the water and extending in a fore-and-aft direction of the vehicle, and means arranged to maintain an air cushion beneath the vehicle when it is operating as a ground effect vehicle, the platform being arranged to carry power plant and its fuel, propulsion means driven by the power plant, and blower means, driven by the power plant, for maintaining the air cushion. Preferably, the platform or raft has a flat bottom and the means for maintaining the air cushion comprises a skirt mounted for downward extension from the platform and for retraction towards the platform. Most conveniently, the skirt is arranged so that it substantially surrounds the floats and the area between them. There are suitable ducting means to conduct the cushion air, and also curtain air if required, from the blower means, and if the floats are (as preferred) inflatable, to supply them, as also to supply inflation air to the skirt if it be inflatable.

Preferably, the floats are extendable by being inflated and retractable by the aid of suction; and preferably the skirt either as a continuous chamber or a subdivided series of chambers, is extendable by inflation, its inflating air also passing out to provide an air curtain.

The floats may be used as sidewalls, confining cushion air between them. They may also be used as stabilisers within the cushion chamber bounded by the skirt.

The platform preferably carries one or more retractable, and if required dirigible, water propellers, which may be rotated in azimuth or used in conjunction with rudders, so as to provide means of propulsion and steering. These may have their own independent power-source, or be driven from the main power plant.

The upper deck or roof of the vehicle is preferably a substantially unbroken area, except for upstanding propulsion and steering means and for the openings for air. It may thus be provided that there is a deck suitable for the carrying of an aircraft, especially a helicopter.

The main propulsion means preferably comprises twin propellers, mounted aft and as pushers associated with aerodynamic fins and rudders.

The whole of the power plant, all except a canopy of the driver's and crew compartment, and the accommodation, are enclosed in a body supported by, and if required, recessed into the platform, and this arrangement is conducive to a low centre of gravity as well as to low aerodynamic drag.

A vehicle according to the invention will now be described by way of example, and with reference to the accompanying schematic drawings, in which.

Figure 1:
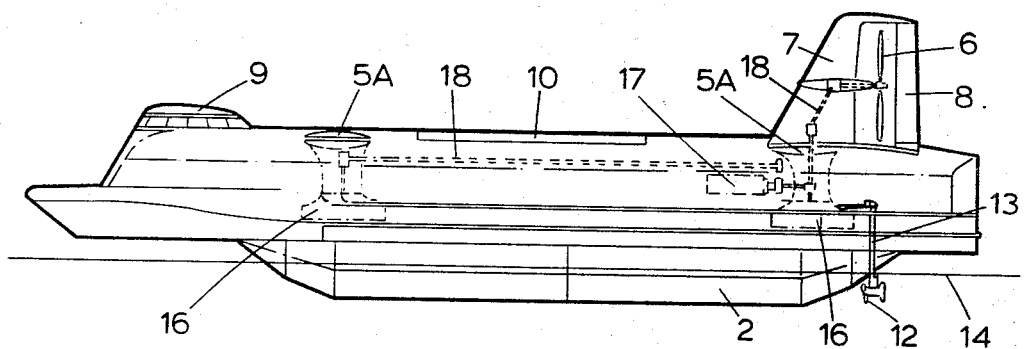
FIGURE 1 is a side elevation with floats and water propellers extended.
Figure 2:
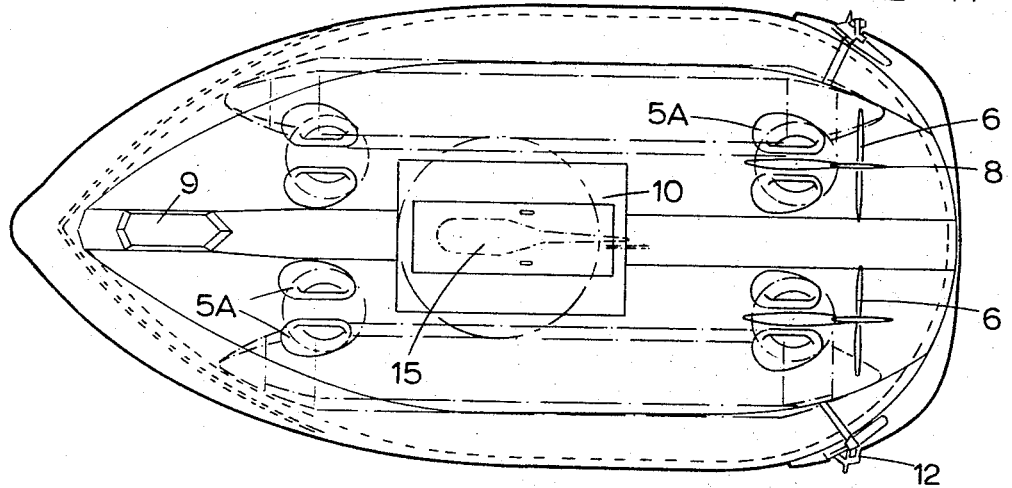
FIGURE 2 is a plan view.
Figure 3:
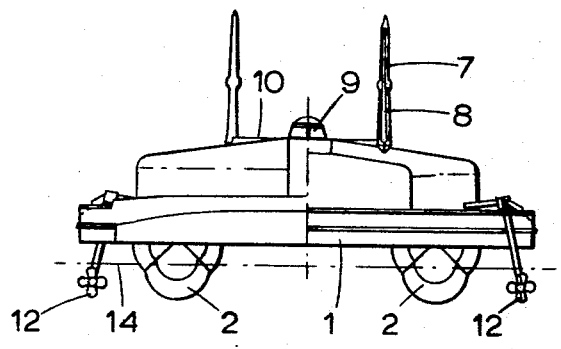
FIGURE 3 shows a part front and part stern elevation.

The vehicle comprises a flat-bottomed platform 1 which is buoyant, being for example an assembly of buoyancy chambers. In the bottom are suitable retraction bays or wells, extending parallel and fore and aft, to accommodate retractable floats 2. These may be of the form described in our co-pending patent application No. 379,848, filed July 2, 1964, according to which a pliable buoyancy chamber, defined over at least a major portion of its surface by a pliable skin, is furnished with apertures through which air may be admitted into the chamber to inflate the skin and sucked out of the chamber to cause the skin to collapse, and a collapsible linkage is provided inside the chamber for governing the folding of the skin in collapsing, so as to provide a flat collapsed pack. A retractable or collapsible peripheral skirt 3 surrounds virtually the whole plan area of the vehicle, and has orifices along its lower edge to provide a curtain air jet indicated at 3A. The skirt 3 is supplied from blower means, through a plenum chamber at 4, into which cushion air is delivered by four symmetrically located ducts 5 with air-ingress openings 5A, each duct 5 housing a blower or fan 16. The blowers 16 are driven from a central power plant 17, by shafts or other suitable transmission 18, and coupled also to the main power plant 17 are two air propellers 6, mounted as a pair at the after end on suitable upright structures including fins 7 and carrying rudders 8. At the forward end of the vehicle is driver and crew accommodation, with a canopy 9. This accommodation, as also accommodation for passengers, freight, fuel and power plant, may be recessed in the plenum chamber 4, and if required into the platform 1, conducively to a low centre of gravity. The whole of the useful capacity volume of the vehicle is distributed over the greater part of its plan area, and it will be seen that the top deck or roof is thus a substantially unobstructed area, of which a part indicated at 10 is able to accommodate an aircraft, such as a helicopter, indicated at 15 (FIGURE 2). The whole vehicle is, therefore, low, of low frontal and keel area, and consequently of low aerodynamic drag.

Figure 4:
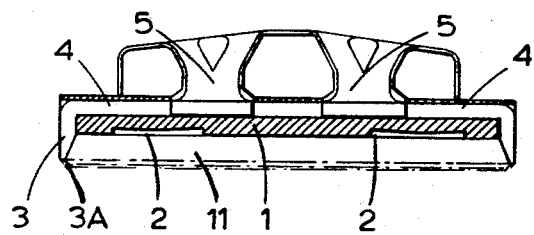
FIGURE 4 is a transverse section, with the floats retracted and skirt extended as for the cushionborne condition.

The floats 2 may be partially retracted so that their ground clearance is greater than that of the extended skirt 3; thus they may act as stabilisers within the cushion chamber which is generally indicated at 11 in FIGURE 4.

It will be noted that when groundborne the flat bottom of the platform 1 affords low loading facilities. Obviously, such hatches, doors, etc., as are required, will be provided.

A pair of water propellers 12 are carried on struts 13 which swing upwards for retraction. Suitable transmission means, adapted to the action of retraction, are provided; they are dirigible for waterborne manoeuvre, and capable of being rotated in azimuth or used in conjunction with rudders, so as to provide means of propulsion and steering. Thus, each water propeller 12 may be driven by way of an electrical or hydraulic fluid transmission so that flexible conductors for the electric current or hydraulic fluid can accommodate the various movements of the propeller axis. Various forms of mechanical gearing can also be arranged to accommodate these movements.

Such a vehicle can "boat" on the floats 2, and a notional waterline is indicated at 14. The vehicle can thus cruise at low speed for long periods, using but little fuel. Then, if required for high speed use, or for overland travel, the skirt 3 is extended, the floats 2 wholly or partly retracted, and the propellers 12 retracted; the cushion blowers are brought into use, and the air propellers used, which being of variable (preferably reversible) pitch, may be constantly connected to the power plant.

Covers may be provided for the ducts 5 to prevent the ingress of water, although some air breathing must be afforded for the power plant.

The power plant is such that it can pump air for float-inflation and, of course, either the main or auxiliary plant provides such hydraulic, electric or pneumatic services as are called for.

Figure 5:
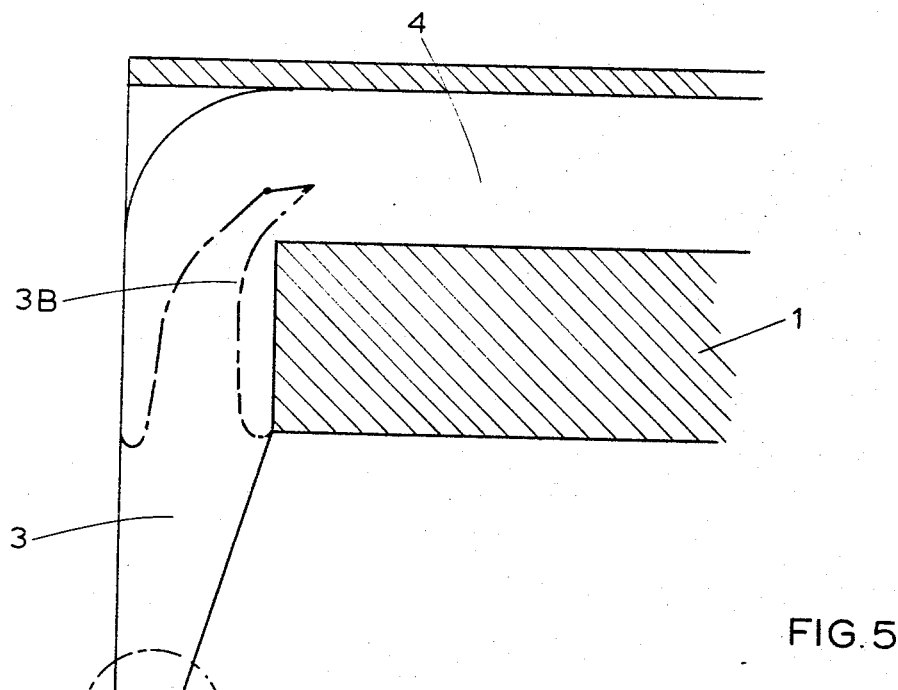
FIGURE 5 is a diagrammatic illustration of a skirt retracted by suction.
Figure 6:
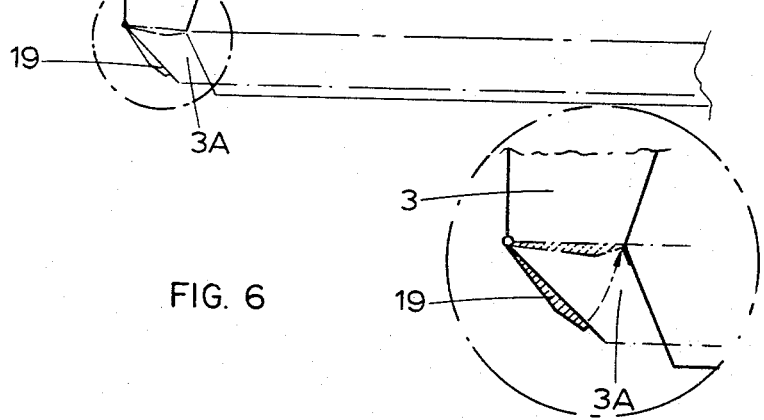
FIGURE 6 is an enlarged view of the encircled lower tip of the skirt in FIGURE 5.
Figure 7:
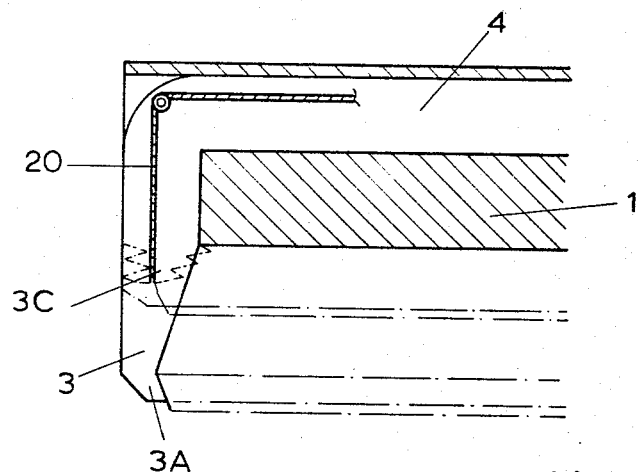
FIGURE 7 is a diagrammatic illustration of a horizontally pleated skirt which is collapsed upwardly by retraction cables.
Figure 8:
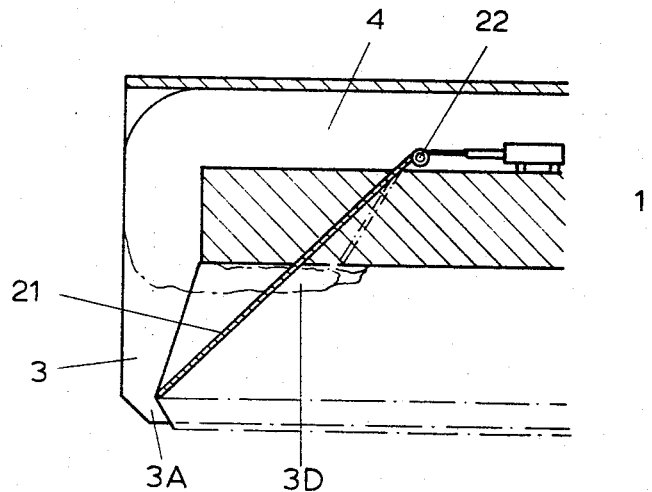
FIGURE 8 is a diagrammatic illustration of a skirt which may be folded inwardly.

Various means may be employed for causing the skirt 3 to retract toward the platform 1. For example, suction may be applied within the skirt. This may cause automatic flap valves 19 at the jet orifices 3A to close, so that the skirt 3, being flexible, is caused by the suction to turn "inside out" with its lower edge rising into a peripheral chamber in the bottom of the platform 1 to a position 3B shown diagrammatically in FIGURE 5. Alternatively, the skirt may be formed with horizontal accordian pleats which enable it to collapse in an upward direction to a position 3C shown diagrammatically in FIGURE 7, under the action of the aforesaid suction or by mechanical means, for example, retraction cables 20. Yet again, the skirt may simply be folded inwardly against the bottom of the platform 1, to a position 3D shown diagrammatically in FIGURE 8, under the action of cables 21 running over pulleys 22 and subjected to a pull exerted from within the vehicle. To enable these various expedients to be applied in a practical fashion, the skirt may be sub-divided into a series of separate chambers, contiguous but isolated from one another and capable of being folded independently of one another.

We claim as our invention:

1. An amphibious ground effect vehicle including a platform or raft of sufficient positive buoyancy to support the whole vehicle and its load on water, downwardly extendable and retractable hull-like floats capable of buoyantly supporting the platform or raft clear of the water and extending along the bottom of the platform in a fore and aft direction of the vehicle and spaced from each other, and means for selectively maintaining an air cushion beneath the vehicle for selective operation as a ground effect vehicle, the platform carrying a power plant and its fuel, propulsion means driven by the power plant, and blower means driven by the power plant for maintaining the air cushion.

2. A vehicle according to claim 1, in which the means for maintaining the air cushion comprise a flexible skirt mounted for downward extension from the platform and for retraction towards the platform.

3. An amphibious ground effect vehicle including a platform or raft of sufficient positive buoyancy to support the whole vehicle and its load on water, downwardly extendable and retractable floats capable of buoyantly supporting the platform or raft clear of the water and extending along the bottom of the platform in a fore and aft direction of the vehicle and spaced from each other, and means for selectively maintaining an air cushion beneath the vehicle for selective operation as a ground effect vehicle, the platform carrying a power plant and its fuel, propulsion means driven by the power plant, and blower means driven by the power plant for maintaining the air cushion, said means for maintaining the air cushion comprising a flexible skirt mounted for downward extension from the platform and for retraction toward the platform, said flexible skirt substantially surrounding the floats and the area between them.

4. A vehicle as claimed in claim 3, in which said floats are so disposed as to act as sidewalls for the operation of the vehicle as a sidewall type ground effect vehicle, or as stabilisers when the vehicle is operating as a skirted ground-effect vehicle.

5. A vehicle as claimed in claim 3, in which the means for maintaining the air cushion comprises means for passing pressurized air down through passages formed in said skirt to issue as an air curtain from the lower end of the skirt.

6. A vehicle according to claim 5, in which the floats are inflatable.

7. A vehicle according to claim 6 in which the skirt is extendable by inflation.

8. A vehicle according to claim 7 furnished with one or more retractable water propellers.

9. A vehicle according to claim 8 having an upper deck or roof presenting an unbroken area suitable for the carrying of an aircraft.

10. A vehicle according to claim 9, in which the propulsion means comprise one or more air propellers mounted aft and as pushers.

11. A vehicle according to claim 10, in which the platform or raft has a substantially flat bottom.

12. An amphibious ground effect vehicle comprising a platform of sufficient positive buoyancy to support the vehicle and its load on water, two spaced substantially parallel buoyancy chambers connected to and depending downwardly from said platform and longitudinally along the bottom of said platform in the fore and aft direction of the vehicle, said buoyancy chambers being formed as inflatable and deflatable chambers from flexible sheet material for selectively buoyantly supporting the platform clear of the water when fully inflated and for retracting upwardly when deflated or partially deflated, a flexible skirt mounted for downward extension from the platform and for retraction toward the platform and substantially surrounding the buoyancy chambers and the area therebetween, means for selectively maintaining a pressurized gas supporting cushion under the platform, and means for propelling the vehicle either as a cushion borne vehicle or as a displacement vehicle, whereby the skirt can be relatively extended and the buoyancy chambers relatively retracted for cushion borne operation, and the skirt can be relatively retracted and the buoyancy chambers relatively extended for water borne operation.

13. An amphibious ground effect vehicle as set forth in claim 12 wherein said skirt incorporates downwardly extending air passages terminating in nozzles at the lower edge thereof, and said means for maintaining an air cushion comprises means for passing pressurized air to said air passages to issue substantially as a curtain from said orifices.

References Cited

UNITED STATES PATENTS

| | | | |
|---|---|---|---|
| 2,453,149 | 11/1948 | McCutchen | 115—1 |
| 3,168,069 | 2/1965 | Everest et al. | 114—67 |
| 3,205,847 | 9/1965 | Smith | 115—1 X |
| 3,258,080 | 6/1966 | Williams et al. | 180—7 |

FOREIGN PATENTS

| | | |
|---|---|---|
| 939,869 | 10/1963 | Great Britain. |
| 953,902 | 4/1964 | Great Britain. |
| 1,003,357 | 9/1965 | Great Britain. |

MILTON BUCHLER, *Primary Examiner.*

ANDREW H. FARRELL, *Examiner.*